May 1, 1962   J. W. DIEHL   3,032,601
HIGH VOLTAGE LEAD TERMINATION
Filed Oct. 8, 1959
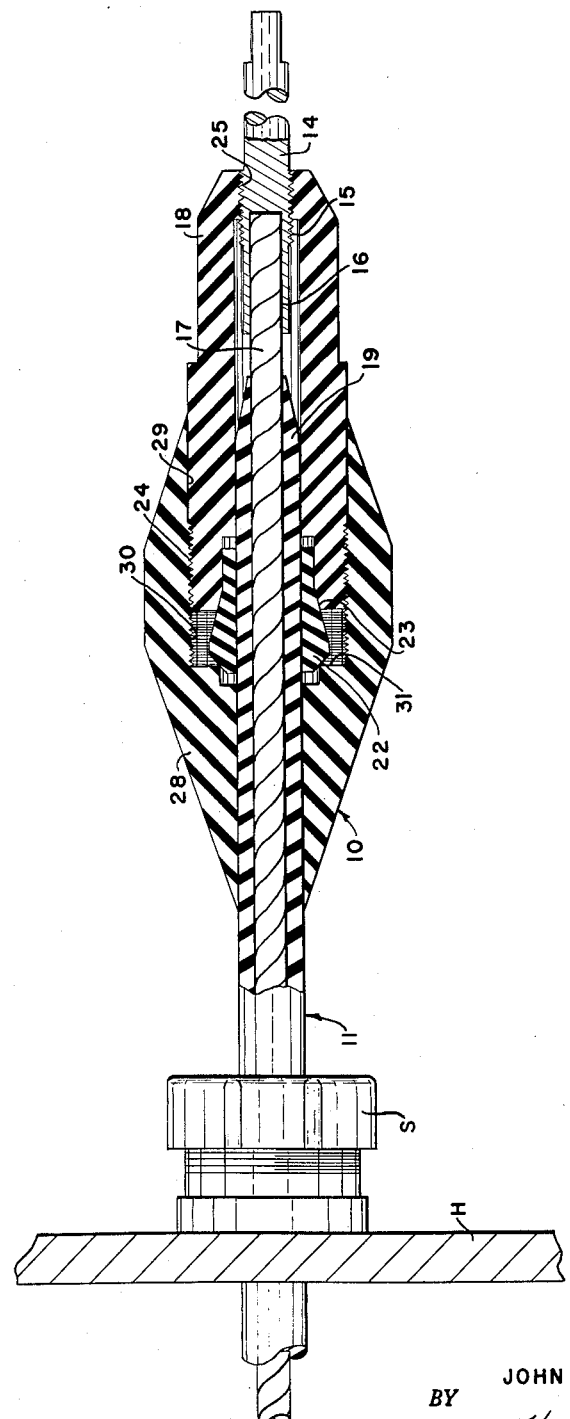
*INVENTOR.*
JOHN W. DIEHL
BY Herman Seid
ATTORNEY.

United States Patent Office 3,032,601
Patented May 1, 1962

3,032,601
HIGH VOLTAGE LEAD TERMINATION
John W. Diehl, Syracuse, N.Y., assignor to Carrier Corporation, Syracuse, N.Y., a corporation of Delaware
Filed Oct. 8, 1959, Ser. No. 845,277
5 Claims. (Cl. 174—19)

This invention relates to electrical terminal connections, more particularly to means for providing a terminal for the lead of a high voltage motor adapted for enclosure within a hermetically sealed fluid containing housing.

In addition to the problems conventionally encountered in extending the conductors or leads from high voltage electrical motors through housings enclosing the motors so as to prevent the leakage of current from the conductor to the grounded housing, additional problems arise where the motors are arranged in hermetically sealed fluid containing housings. Thus where the motor is employed to drive a compressor as utilized in refrigeration systems, the motor compressor unit is generally arranged in a hermetically sealed housing. The conventional stranded conductors or cables employed for the windings of these motors must be extended to a terminal to which an external current supply conductor may be connected. With conventional terminal blocks arranged adjacent the surface of the housing, conventional lead through bushings must be employed in which a relatively long surface path is provided between the exposed conductors and the grounded housing. The use of these conventional lead through bushings, and terminal blocks requires an increase in the volume of the housing to accommodate said lead through connections, with a resultant increase in material costs and volumetric requirements for installation of the equipment. In order to eliminate the need for connecting current supply conductors to the high voltage motor leads internally of the housing, with the resultant increase in space requirements it has been proposed to provide motor conductor terminals externally of the housing. This however necessitates relatively elaborate seals to prevent leakage of the high pressure fluids contained within the housing along the conductor. In order to provide the necessary terminal connections it has thus previously been necessary to fabricate the terminal connections at the factory by relatively time consuming and costly processes.

It is with the above problems in mind that the present means have been evolved, means permitting the provision of a motor conductor terminal in which the motor is hermetically sealed within the housing containing a relatively high pressure fluid. The novel terminal is formed externally of the housing, on the motor lead in such a fashion as to preclude the leakage of current from the lead to ground, and simultaneously to prevent the loss of any fluids from the housing along the lead. Additionally the novel terminal structure may be readily assembled manually after the motor is positioned as desired.

It is accordingly a primary object of the invention to provide an improved high voltage lead terminal structure.

Another object of the invention is to provide a terminal structure for stranded electrical conductors leading from hermetically enclosed equipment so as to prevent the leakage of fluid from the equipment enclosure along said conductors.

It is also an object of this invention to provide novel means for extending a high voltage electrical conductor through the wall of a hermetically sealed housing in a simple manner after installation of the equipment contained within the housing.

An additional object of the invention is to provide a novel connector between a terminal piece and a high voltage conductor in which current leakage between the point of connection of the terminal piece and the conductor is prevented.

A further object of the invention is to provide improved terminal means for forming a terminal externally of the housing of a hermetically sealed motor.

Another object of the invention is to provide means implementing the making of electrical connections between a conductor in a housing and one externally of the housing without requiring the use of terminal lead through blocks.

A further object of the invention is to provide a novel motor lead terminal which is simple in manufacture, maintenance and use.

These and other objects of the invention which will become apparent from the following description and claims, are achieved by provision of a solid conductor employed as a terminal piece. This solid terminal piece is joined to the end of an insulated stranded conductor or lead extended through to the housing of the hermetically sealed equipment. A layer of insulating material in the form of a body insulator is then extended from the solid terminal piece to the conductor insulation, and an insulating sleeve is then provided over the aforementioned layer of insulating material and the conductor insulation. The body insulator, insulating sleeve, and terminal piece are pre-fabricated of requisite dimensions and are readily installable manually at the site of installation of the equipment to which the stranded conductor leads.

A primary feature of the invention resides in the fact that by employing the hereindisclosed novel means, a terminal may be provided on a lead from a hermetically enclosed electric motor in which the volumetric requirements of the motor housing are not increased as a result of the provision of the lead, and conventional sealing techniques may be employed to seal the insulated motor lead through the hermetic housing.

Another feature of the invention is that the novel means prevent the leakage of fluid along the stranded conductor.

A further important feature resides in the fact that a secure connection is effected manually not requiring particular tools or equipment.

The specific structural details of the invention, and the method of attaining same, will be made most manifest and particularly pointed out in clear, concise, and exact terms in conjunction with the accompanying drawing wherein:

The FIGURE is a cross sectional view through the novel lead-terminal connector.

As best seen in the drawing, the terminal structure 10 is shown as formed on the lead 11 extending through a motor housing H through an appropriate seal S.

Terminal structure 10 comprises a solid terminal piece 14 formed of a suitable conductor such as copper or the like. One end of terminal piece 14 is provided with a thread 15 for a purpose to become hereinafter more apparent and the other end has a recess 16 of a diameter sufficient to accommodate the stranded conductor 17 of lead 11 whereby the ends of stranded conductor 17 will be covered. An insulating layer in the shape of body insulator 18 is provided to extend from lead insulation 19 to and over terminal piece 14. A compression ring 22 formed of a suitable elastomeric material is arranged to extend from recess 23 formed at the end of body insulator 18. A thread 24 is formed on body insulator 18 at the end thereof adjacent recess 23, and a tapped aperture 25 is formed at the opposite end of the body insulator for engagement with threads 15 on terminal piece 14.

An insulating sleeve 28 is provided for arrangement over body insulator 18 and insulation 19 of lead 11. Insulating sleeve 28 is formed with a center bore having an internal diameter permitting a press fit between terminal lead 11 and said bore. A counter bore 29 having a tapped portion 30 is provided in sleeve 28 for engagement with thread 24 of body insulator 18. Shoulder 31 formed within counter bore 29 bears up against compression ring 22.

The novel terminal structure 10 permits the efficient provision of a terminal on a lead 11 and is particularly adapted for use in conjunction with high voltage equipment encased in a hermetically sealed housing. Thus with particular reference to hermetically enclosed motor driven compressors as employed in refrigeration systems, motor lead 11 is extended from housing H through an appropriate seal S for a suitable distance. The free end of the lead 11 is then stripped of insulation to expose stranded conductor 17. A taper is preferably formed at the end of insulation 19 to permit insulation stripping without cutting of the conductor strands, and serving to implement joining of the lead to the terminal structure components.

The exposed conductor is then joined to terminal piece 14 in any suitable fashion to provide a secure electrical connection as by soldering, the use of crimping connectors, or the like. Insulator sleeve 28 is slid over lead 11 either before or after the terminal piece 15 is joined to conductor 17. Thereafter, a layer of insulating material in the form of body insulator 18 having compression ring 22 assembled therewith is arranged to extend over terminal piece 14 and lead insulation 19. Body insulator 18 is secured with respect to terminal piece 14 by engaging tapped recess 25 with threads 15 of the terminal piece 14, a suitable thread sealant being employed. The entire assembly is arranged in an operative condition by engaging taps 30 of sleeve 28 with threads 24 of body insulator 18 causing compression ring 22 to be compressed therebetween.

It will be observed that the flow path of any fluid from housing H along stranded conductor 17 is substantially blocked by the action of compression ring 22, since any fluid such as compressed refrigerant passing along the strands of conductor 17 to the interior of body insulator 18 will be retained by the action of threads 15, the solid lead termination and the appropriate thread sealant employed on the one end; and the action of compression ring 22 on the other.

It is thus seen that a simple terminal structure has been provided which permits the manual installation of a terminal at the end of a high voltage lead extending from a fluid containing hermetically sealed housing. The novel lead structure prevents the loss of fluid from the properly chosen insulation jacket along the stranded conductors and implements the connection of the terminal piece to the conductor in a simple, efficient manner without requiring any special equipment.

The above disclosure has been given by way of illustration and elucidation, and not by way of limitation, and it is desired to protect all embodiments of the herein disclosed inventive concept within the scope of the appended claims.

I claim:
1. A terminal structure for an electrical lead formed of an insulated stranded conductor, said structure comprising a solid terminal piece electrically connected to the stranded conductor of the lead and covering the ends of the conductor strands; a body insulator engaging said terminal piece and extending over the insulation of the lead and enclosing an exposed portion of the lead conductor; an insulating sleeve surrounding and securely engaging said body insulator and extending over the insulation of the lead; and a compression ring positioned within said insulating sleeve in abutting relationship with the end of said body insulator extending over the lead insulation adapted to be compressed between the sleeve and the body insulator.

2. A terminal structure as in claim 1 in which mating thread surfaces are formed between the exterior surface of said body insulator and an interior surface of said insulating sleeve to provide secure screw engagement therebetween.

3. A terminal structure as in claim 1 in which said body insulator is formed with a recess within which a portion of said compression ring is received; and a shoulder is formed within said insulating sleeve to abut against said compression ring to force same against the insulation of the lead.

4. A terminal structure for a high voltage electrical lead formed of an insulated stranded conductor, said structure comprising: a solid conductor terminal piece having a recess within which the ends of the stranded conductor are received to cover said ends, said terminal piece being electrically connected to the lead conductor and having a threaded surface portion; a body insulator forming a layer of insulation over an exposed portion of the lead conductor, said insulator having a tapped recess at one end through which said terminal piece extends in screw threaded engagement, and a compression ring retaining recess at another end; a compression ring arranged in the retaining recess of said body insulator; and an insulating sleeve arranged over the insulation of the lead and surrounding said body insulator, said sleeve being formed with a thread on an interior surface to securely engage a thread on an exterior surface of said body insulator, and having an internal shoulder abutting against said compression ring to force said ring against the lead insulation.

5. Means as in claim 4 in which means are provided at each end of said body insulator to form a seal between said body insulator and said solid conductor terminal piece and the insulation of the conductor respectively.

References Cited in the file of this patent
UNITED STATES PATENTS

| | | |
|---|---|---|
| 2,282,003 | Scott et al. | May 5, 1942 |
| 2,355,166 | Johanson | Aug. 8, 1944 |
| 2,370,288 | Brolinson | Feb. 27, 1945 |
| 2,452,580 | Lee | Nov. 2, 1948 |
| 2,958,844 | Smith et al. | Nov. 1, 1960 |